United States Patent [19]
Dony

[11] Patent Number: 4,989,698
[45] Date of Patent: Feb. 5, 1991

[54] CONTROL DEVICE FOR A LOCKABLE GAS SPRING

[75] Inventor: Dominique Dony, Roulans, France
[73] Assignee: AIRAX, France
[21] Appl. No.: 410,260
[22] Filed: Sep. 21, 1989

[30] Foreign Application Priority Data

Sep. 30, 1988 [FR] France ................................ 88 12797

[51] Int. Cl.$^5$ .............................................. A47C 3/30
[52] U.S. Cl. ........................................ 188/300; 92/29;
267/64.12; 188/322.11
[58] Field of Search ...................... 267/64.12; 188/319,
188/300, 321.11, 322.11; 92/29, 20

[56] References Cited

U.S. PATENT DOCUMENTS 4,124,202 11/1978 Hatakeyama .......................... 188/300
4,420,066 12/1983 Bogenschutz ......................... 92/20 X

FOREIGN PATENT DOCUMENTS 0050465 4/1982 European Pat. Off. .
1955308 12/1966 Fed. Rep. of Germany .
6910925 11/1969 Fed. Rep. of Germany .
3325798 1/1985 Fed. Rep. of Germany .
1502431 11/1967 France .
2350075 12/1977 France .
2488499 2/1982 France .
2461851 1/1985 France .
619604 10/1980 Switzerland .

*Primary Examiner*—Matthew C. Graham
*Attorney, Agent, or Firm*—Stevens, Davis, Miller & Mosher

[57] ABSTRACT

The invention relates to a control device for a gas spring which can be locked as desired by displacement of a sliding control finger. Two axially elongated, diametrically opposed windows (14), at least one of which is larger at the end nearest to the gas spring, pass through a tubular connector (1) coaxial with the control finger (6). A lever (2) which has thinner parts (25, 26) flanking a wide part (24) engages in these windows. Devices (7) are provided so that, after mounting on the gas spring, the wide part (24) is unable to reach the wide section of the window, thus preventing the lever from being dislodged. The edges of the windows (14) form bearing points for the pivoting movement of the leaver and the actuation of the control finger (6).

6 Claims, 2 Drawing Sheets

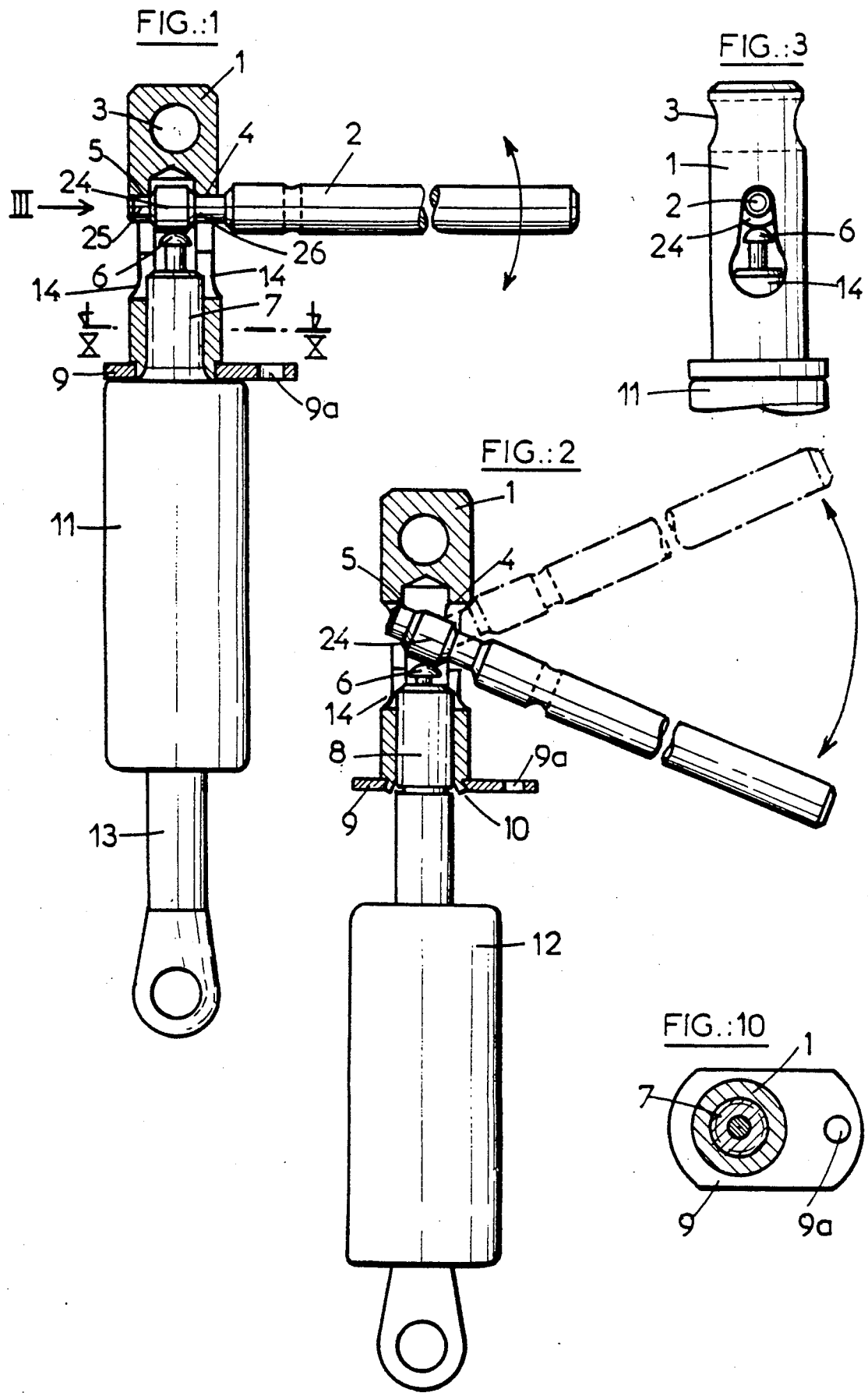

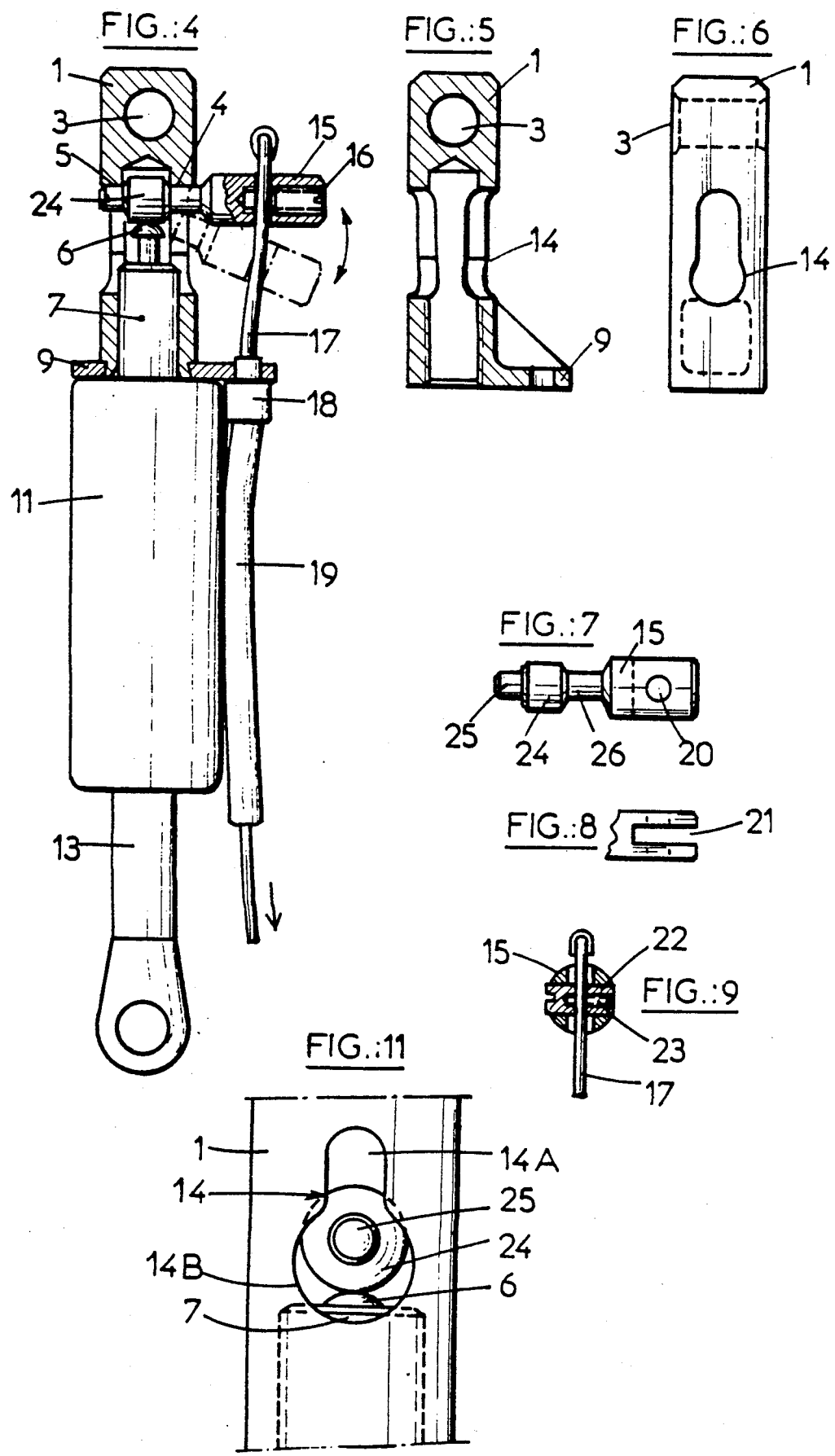

CONTROL DEVICE FOR A LOCKABLE GAS SPRING

BACKGROUND OF THE INVENTION

The present invention relates to a control device for a lockable gas spring.

Lockable gas springs are used in numerous devices (beds, armchairs, stands etc.) to ensure infinitely variable adjustment, balancing of a weight, and speed control; these three functions are executed together or separately. The springs are equipped with a control finger located at one of their ends (rod side or tube side). This finger must be axially displaced by a few millimeters and returns automatically; the displacement is always towards the gas spring piston. The gas spring is usually mounted between a fixed point and a pivoting movable point which makes the execution of this control problematic. The reason for this is that when the gas spring is operated it pivots about its fixed point as a result of the movable point describing an arc of a circle and therefore a control device adapted to this pivoting movement must be provided.

It has been proposed, in FR-A-2,461,851, to use a U-shaped resilient leaf, one arm of which is integral with the gas spring and the other arm of which bears against the head of the control finger. A cable assembly is provided for the displacement of this arm of the leaf. This system is complex and very expensive.

In some systems, cf. DE-U-1,955,308, an actuating lever is articulated about a fulcrum perpendicular to the axis of the gas spring and at a distance from this axis. When the lever pivots, its end causes the displacement of the head of the control finger. Because of the presence of a fulcrum and of a support, which is connected to the gas spring, for this fulcrum, this system has the disadvantage of being relatively expensive.

A device has been proposed, in DE-U-6,910,925, in which the finger of a locking device is actuated by a lever whose articulation consists merely of a hole which passes through a tubular element surrounding the finger. Additional components, however, are still necessary to prevent an undesirable displacement of the lever.

A mechanism has also been proposed, in EP-A-0,050,465, in which the actuating lever is held in two diametrically opposed orifices of a tubular component surrounding the actuating finger and bearing on the edge of either of these orifices in order to depress the finger. Grooves provided in the lever cooperate with the edges of the orifices or with the finger to prevent the lever from being dislodged, but a more considerable stress exerted upon the lever and directed simultaneously axially and radially may cause the lever to be dislodged from the location provided. This risk can be reduced by using an additional retaining spring, but assembly is then made more difficult.

The object of the present invention is to provide an actuating device in which the number of components is as small as possible and which nevertheless functions with a high degree of safety.

SUMMARY OF THE INVENTION

To achieve this objective the invention provides a control device for a lockable gas spring comprising a closed enclosure and a movable rod which projects tightly from the said enclosure and which bears a piston which divides the enclosure into two chambers and means for connecting the two chambers, if desired, the device comprising a tubular connector designed so as to be fixed onto a fixing connector which is provided at the end of the connector or of the rod of a lockable gas spring, or which consists of an extension of a wall of the lockable spring, and through which a sliding control finger, whose head projects at the end of the fixing connector passes axially, and an actuating lever, which includes a wide part flanked by two parts with a smaller cross-section. There are two diametrically opposed windows provided in the tubular connector, said windows, at least in their section furthest from the gas spring, have a cross-section such that the parts of the said lever with a small cross-section, but not the wide part of this lever, can engage therein, at least one of the windows, in its section nearest the gas spring, having a larger cross-section so that the wide part of the lever can pass through. The actuating lever, in its operative position, is mounted in the tubular connector with the two sections with a smaller cross-section engaged in the said windows and the wide part is in contact with the head of the said control finger so as to displace it axially when the said lever pivots in a plane containing the axis of the spring by bearing against an edge of one of the said windows; and means which after the connector has been mounted on the gas spring, prevent the wide part of the lever from entering the said window section with the larger cross-section.

To facilitate manufacture the two windows are preferably identical.

Resilient means are preferably also provided which push the lever away from the gas spring so as to maintain the said lever parts with the smaller cross-section in the window sections with the smaller cross-section.

The said resilient means advantageously consist of the internal pressure of the gas spring, which tends to push the control finger outwards.

According to a simple embodiment, the means for preventing the wide part of the lever from entering the wide section of the window or windows consist of the end of the fixing connector of the gas spring.

The tubular connector preferably includes a bearing component which has a sheath stopping means for a control system using a sheathed cable, while the lever has means for fastening the cable of the said control system, these means being at a distance from the wide part of the said lever and from the parts of the said lever with a small cross-section.

SHORT DESCRIPTION OF THE DRAWINGS

The invention will now be described in more detail by reference to exemplary embodiments illustrated in the drawings, in which:

FIG. 1 is a sectional view of a direct control device according to the invention fitted to the end of the body of a gas spring.

FIG. 2 is a similar section of a device fitted to the rod of a gas spring.

FIG. 3 is a view in accordance with the arrow III of FIG. 1.

FIG. 4 is a view similar to that in FIG. 1 but with a cable control system.

FIG. 5 is a sectional view, similar to that in FIGS. 1, 2 and 4, of the connector in another embodiment.

FIG. 6 is a view, similar to that in FIG. 3, of the connector of FIG. 5.

FIGS. 7, 8 and 9 show the fastening of the cable in plan view, side view and in cross-sectional view of the connector lever.

FIG. 10 is a sectional view along the line XX of FIG. 1.

FIG. 11 is a partial front view of the device according to the invention seen along the axis of the lever.

DETAILED DESCRIPTION OF THE PREFERRED EMBODIMENTS OF THE INVENTION

FIGS. 1 and 2 show a combined connector 1 in longitudinal section mounted on a lockable gas spring.

As seen in FIG. 1 the combined connector 1 is screwed onto the threaded connector 7 of a lockable gas spring 11 whose control system is located at the base of the tube (opposite to the rod). The control lever 2 is in the neutral position and is held against bearings 4 and 5 by the control finger 6 of the lockable gas spring. A plate 9 fitted with a hole 9a provided for the stopping sheath 18 is fastened to the base of the combined connector 1. The control finger 6 is slightly prestressed by the wide part 24 of the control lever 2 located between two thinner parts 25, 26 corresponding to the bearings 4 and 5. The combined connector 1 contains a radially drilled through hole 3 which allows the gas spring to be fastened to a spindle.

As seen in FIG. 2, the combined connector 1 is screwed onto the rod 8 of a lockable gas spring 12 whose control finger 6 is located at the end of this rod. When the lever 2 is actuated the control finger is depressed by the wide part 24. The lever bears against the point 5 of the connector when a downward pressure is exerted on it and on the point 4 when an upward pressure is exerted.

The plate 9 is fastened by crimping to the base of the combined connector 1. The wide part 24 of the lever 2 has a twin function: it acts upon the control finger 6 and holds the lever 2 captive within the combined connector 1 while at the same time allowing the clearance required for operation.

In FIG. 3 the slot 14 in the shape of a buttonhole narrowed at the top is drilled radially through the combined connector 1 from one side to the other. The wide part 24 of the lever 2 can pass through the buttonhole and the two thinner portions 25 and 26 of this lever slide into the corresponding slot in the upper part of this buttonhole.

In FIG. 3 the top part of the threaded connector 7 can be seen through the slot 14. It is understood that the relative position of this top part and of the wide sections of the slots is calculated so as to prevent the wide part 24 from reaching these wide sections of the slots, and that when the combined connector 1 fastened to the threaded connector 7 is unscrewed the lever is freed and its wide part can then pass without difficulty through the slot.

The levers 2 or 15 are therefore positioned in the combined connector 1 before this connector is mounted on the lockable gas spring 11 or 12.

FIG. 10 shows a cross-section of the combined connector 1.

FIG. 4 shows a longitudinal section of the combined connector 1 fitted with a lever 15 enabling remote control by means of a flexible cable 17 and a sheath 19.

The lever 15 is equipped with a means for locking the cable, the cable here passing through a radial hole and being held in position by a screw 16 mounted axially in an intersecting hole.

FIGS. 7 and 9 shows another means of locking the cable: a pin 22 equipped with a screw 23 locks the cable 17. This pin is mounted freely in the hole 20 of the lever 15; the cable passes through the slot 21 and holds the pin in position in the transverse direction. This form of mounting is known for brake control systems in bicycles.

FIGS. 5 and 6 show an alternative manufacture of the combined connector by moulding.

As seen in FIG. 11 a combined connector 1 provided with an inside screw thread is screwed onto a threaded connector 7 which is an extension of a gas spring (not shown). A slot 14 passes through the combined connector 1. The slot has a section with a small cross-section 14A, located opposite the threaded connector 7, and a wide section 14B nearer the connector 7. The size of the thin section 14A is slightly larger than a thin portion 25 of the control lever and the cross-section of the wide part 14B is slightly larger than the diameter of the wide part 24 of the same lever.

In the position shown the lever is pressed towards the connector 7 and abuts the latter by way of the control finger 6, which is itself in its position of maximum depression. The end of the connector 7 and of the control finger 6 can be seen in the figure and it is evident that the wide part 24 of the lever is partially in front of the thin section 14A of the slot so that the lever is unable to pass through the slot. It is readily evident that, after a relative unscrewing of the combined connector 1 and of the threaded connector 7 for a sufficient length, it will be possible for the whole of the wide part 25 of the lever to be opposite the wide section 14B of the slot and that the lever can then be withdrawn.

For assembly, the lever is first positioned in the combined connector by passing it through the windows 14 after which the combined connector 1 and the threaded connector 7 are screwed together. The lever is then locked and cannot be dislodged.

The combined connector 1 can be manufactured in different forms without falling outside of the scope of the invention:

(a) the fastening means 3, which is a radial hole, can be either a ball-and socket joint, a screw thread, a clamp, or a straight or tapered shank etc., (b) the means for fastening to the gas spring is usually a screw thread but it may also be fastened either by crimping, clamping, or rivetting etc., (c) the sheath stop plate 9 can be integral with the combined connector 1 (FIG. 5) or attached (FIG. 1); it can be removable and positioned as desired.

The invention provides users of a lockable gas spring with a simple and inexpensive means for effecting either direct or remote control having a small number of components; the lever can be actuated either by the exertion of downward or upward pressure, and the force required for control is reduced owing to the action of the lever arms.

If there is substantial friction between the cable and the sheath when using a remote control cable system, a compression spring can be added between the sheath stop plate and the operating lever, promoting return to the starting position.

In conclusion the invention has the following advantages:

the lever is mounted in the connector before the connector is mounted on the gas spring.

- the lever is held radially captive in the connector when it is in the narrow section 14A of the slot 14.
- the lever is held axially and radially captive in the connector when the connector is mounted on the gas spring.
- the special shape of the slot 14 machined through the body allows the lever to be operated both by exerting a downward and an upward pressure within a plane passing through the axis of the gas spring.
- the lever is freely displaceable within the narrow section 14A of the slot 14 so as to ensure axial operation of the control finger.
- the lever can be operated either directly or by a flexible cable sliding in a sheath, this sheath bearing against a fixed part of the connector.
- the connector and the lever are manufactured very simply using usual means.
- the connector can be adapted very easily to existing assemblies by different processes (holes, spindle, ball- and socket joint, thread tapping, straight shank etc).

I claim:

1. Control device for a lockable gas spring having two end comprising a closed enclosure and a movable rod which projects tightly from the said enclosure and which bears a piston which divides the enclosure into two chambers and means for selectively connecting the two chambers, the device comprising a tubular connector which is designed so as to be fixed onto a fixing connector provided at one of the ends of the gas spring, and through which a sliding control finger whose head projects outside the fixing connector passes axially;

an actuating lever which includes a wide part flanked by two parts with a smaller cross-section;

two diametrically opposed windows provided in the tubular connector, said windows, at least in their section furthest from the gas spring, having a cross-section such that the parts of the said lever with a small cross-section, but not the side part of this lever, can engage therein, at least one of the windows, in its section nearest the gas spring, having a larger cross-section so that the wide part of the lever can pass through;

the actuating lever, in its operative position, being mounted in the tubular connector with the two sections with a smaller cross-section engaged in the said windows and the wide part being in contact with the head of the said control finger so as to displace the control finger axially when the said lever pivots in a plane containing the axis of the spring by bearing against an edge of one of the said windows; and means which, after mounting the connector on the gas spring, prevent the said wide part of the said lever from entering the said window section with a larger cross-section.

2. Device according to claim 1, characterized in that the two windows are identical.

3. Device according to claim 1, characterized in that resilient means are provided which press the lever away from the gas spring so as to hold the said lever parts with a smaller cross-section in the window sections with a smaller cross-section.

4. Device according to claim 3, characterized in that the said resilient means consist of the internal pressure of the gas spring, which tends to push the control finger outwards.

5. Device according to claim 1, characterized in that the said means for preventing the wide part of the lever entering the wide part of at least one of the windows consist of the end of the fixing connector of the gas spring.

6. Device according to claim 1, characterized in that the tubular connector includes a bearing component which has a sheath stopping means for a control system using a sheathed cable, while the lever has fastening means for fastening the cable of the said control system, these fastening means being at a distance from the wide part of the said lever and from the parts of the said lever with a small cross-section.

* * * * *